(12) United States Patent
Kantak et al.

(10) Patent No.: US 6,376,117 B1
(45) Date of Patent: Apr. 23, 2002

(54) INTERNAL FUEL STAGING FOR IMPROVED FUEL CELL PERFORMANCE

(75) Inventors: Milind V. Kantak, Mayfield Heights; Thomas L. Cable, Newburg, both of OH (US)

(73) Assignee: SOFCO L.P., New Orleans, LA (US)

(*) Notice: Subject to any disclaimer, the term of this patent is extended or adjusted under 35 U.S.C. 154(b) by 0 days.

(21) Appl. No.: 09/618,525

(22) Filed: Jul. 18, 2000

(51) Int. Cl.[7] ............................................... H01M 8/04
(52) U.S. Cl. ............................. 429/39; 429/31; 429/32
(58) Field of Search ............................. 429/31, 34, 38, 429/39, 32

(56) References Cited

U.S. PATENT DOCUMENTS 6,033,794 A    3/2000   George et al.

*Primary Examiner*—Gabrielle Brouillette
*Assistant Examiner*—Jonathan Crepeau
(74) *Attorney, Agent, or Firm*—Robert C. Baraona

(57) ABSTRACT

A fuel cell having an anode and a cathode side with fuel flowing over the anode side and air over the cathode side has a staging plate located on the anode side of the fuel cell to divide the flow of fuel to two different sections of the anode. A second staging plate may be used to divide the flow of fuel to three different sections of the anode and various apertures may be formed in the plates, such as rectangles triangles or ovals, to direct fuel flow to desired areas of the anode.

19 Claims, 5 Drawing Sheets

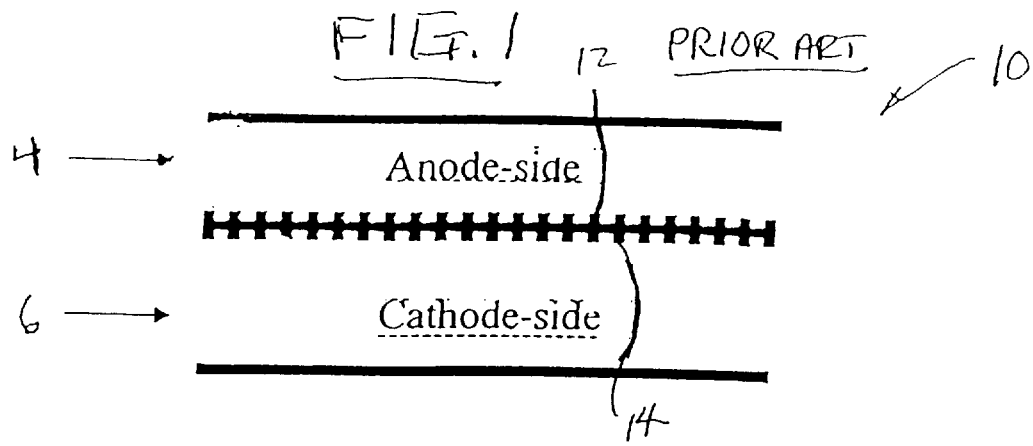
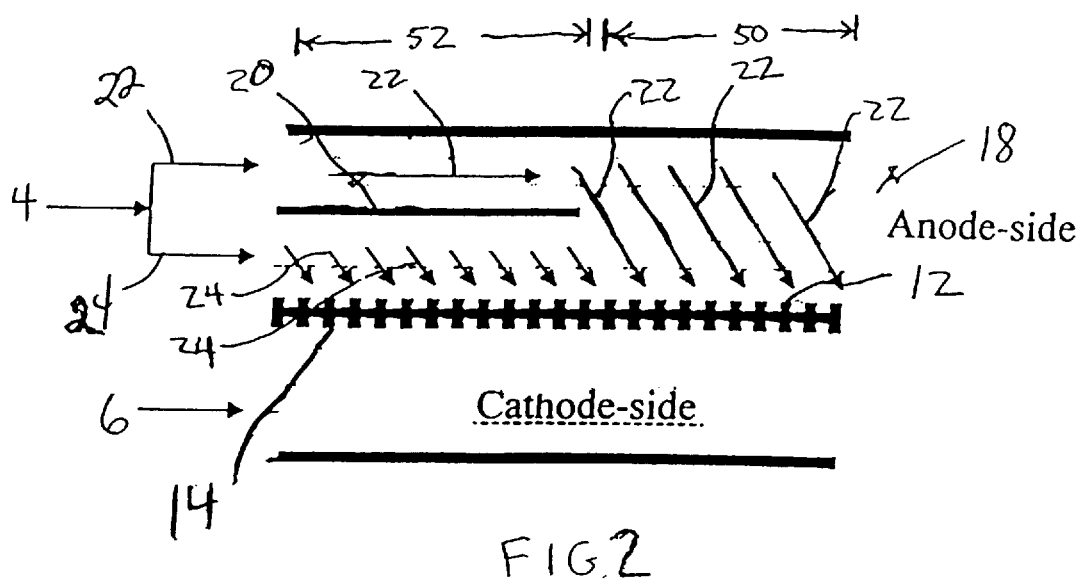

INTERNAL FUEL STAGING FOR IMPROVED FUEL CELL PERFORMANCE

BACKGROUND OF THE INVENTION

1. Field of the Invention

The present invention is generally drawn to a fuel cell construction for optimizing fuel cell performance and achieving high fuel cell system efficiency and more particularly to a staged fuel cell structure for achieving same.

2. Description of the Prior Art

Fuel cells are electrochemical devices that convert the energy of a chemical reaction directly into electrical energy. The basic physical structure of a single fuel cell includes electrodes (an anode and a cathode) with an electrolyte located there between in contact with the electrodes. To produce electrochemical reaction at the electrode, a fuel stream and a oxidant stream are supplied to the anode and cathode, respectively. The fuel cell electrochemically converts a portion of the chemical energy of the fuel in the fuel stream to electricity, while the remaining amount of the chemical energy is released as heat. A stack of individual fuel cells is preferably connected in electrical series to generate a useful additive voltage.

The type of electrolyte used in a fuel cell is generally used to classify the fuel cell and is also determinative of certain fuel cell operating characteristics, such as operating temperature. Present classes of fuel cells include the Polymer Electrolyte Fuel Cell (PEFC), the Alkaline Fuel Cell (AFC), the Phosphoric Acid Fuel Cell (PAFC), the Molten Carbonate Fuel Cell (MCFC), and the Solid Oxide Fuel Cell (SOFC).

Ideally, fuel cell performance is expected to depend only on the fuel composition and the amount of fuel consumed at the anode side. However, typical voltage-current and power characteristics of operating fuel cells show a performance drop due to many resistances, including the fuel utilization resistance. This utilization resistance is primarily caused by the driving force variation (across the electrode-electrolyte assembly), which is itself due to a fuel composition gradient over the anode surface.

In fuel cell literature, various designs of anode-electrolyte-cathode and associated flow passages are available for constructing multi-layer fuel cell stacks. The most common configurations are the planar and tubular assemblies. In either case, the fuel and oxidant (e.g., air) flow past the surface of the anode and cathode placed opposite the electrolyte, respectively, so that the anode surface is in direct contact with the fuel and the cathode surface is in direct contact with air. The flow passages are connected to the inlet and outlet manifolds on both the anode and cathode sides.

In all fuel cells, the fuel composition decreases due to electrochemical reactions as the fuel passes across the anode from the inlet to the outlet. This gives rise to species concentration gradients, which are mainly responsible for uneven fuel utilization and unwanted temperature gradients on the anode surface. The cell voltages drop to adjust to the lowest electrode potential for the depleted species compositions at the exit of the anode and cathode sides.

Referring now to the drawings generally and FIG. 1 in particular, a known fuel cell assembly (10) is shown. The fuel (4) and oxidant (6), preferably air, flow past the surface of an anode (12) and cathode (14) placed on opposite sides of an electrolyte (not visible) so that the anode surface (12) is in direct contact with the flow of fuel (4) and the cathode surface (14) is in direct contact with flow of air (6). The flow passages are fluidically connected to known inlet and outlet manifolds (not shown) on both the anode (12) and cathode (14). The problems associated with this type of construction have been described above.

Accordingly, staging of fuel cells is one known way to help alleviate this problem. U.S. Pat. No. 6,033,794 "Multi-stage Fuel Cell System Method and Apparatus" discloses a fuel cell system consisting of multiple fuel cells. The gas flow paths in the cells are connected in an externally staged, serial, flow-through arrangement. This arrangement has a series of higher temperature fuel cells which utilize the increased temperature of the fuel as it exits each consecutive fuel cell in order to improve fuel cell efficiency.

Notably, no known staging of the inlet fuel to one individual fuel cell exists, although such inlet staging could provide better utilization of the fuel, a more even temperature distribution, and, generally, a more efficient fuel cell. Thus, inlet staging to a single fuel cell would be welcome by the industry, as this single cell inlet staging would permit enhanced performance of both individual cells, as well as entire stacks.

SUMMARY OF THE INVENTION

The present invention solves the mentioned problems of improving the fuel and temperature distribution of fuel cells, as well as others, by providing an internal fuel cell staging technique to alleviate fuel composition non-uniformity and the problems associated therewith. Thus, fresh incoming fuel is internally distributed by placing at least one internal staging plate inbetween the flow fields of the fuel to the anode of the fuel cell. This plate or plates may be formed as a flow divider plate having apertures therein (preferably of a rectangular or triangular shape and/or a pattern of essentially round shapes) to divide the flow of the raw fuel to different areas of the anode to stage the fuel flow thereby.

In view of the foregoing it will be seen that one aspect of the present invention is to provide a single fuel cell with a staged fuel input for increased efficiency.

Another aspect of the present invention is to provide a unique distribution of fuel cell fuel over an anode of a fuel cell.

These and other aspects of the present invention will be more fully understood after a careful review of the following description of the preferred embodiment when considered with the accompanying drawings.

BRIEF DESCRIPTION OF THE DRAWINGS

In the drawings:

FIG. 1 is a cross-sectional side view of a known fuel cell with normal flow of fuel and air through the anode and cathode thereof;

FIG. 2 is a cross-sectional side view of a fuel cell having a staging plate therein to split the flow of fuel over the anode as per the invention;

DESCRIPTION OF THE PREFERRED EMBODIMENT

Figure 3:
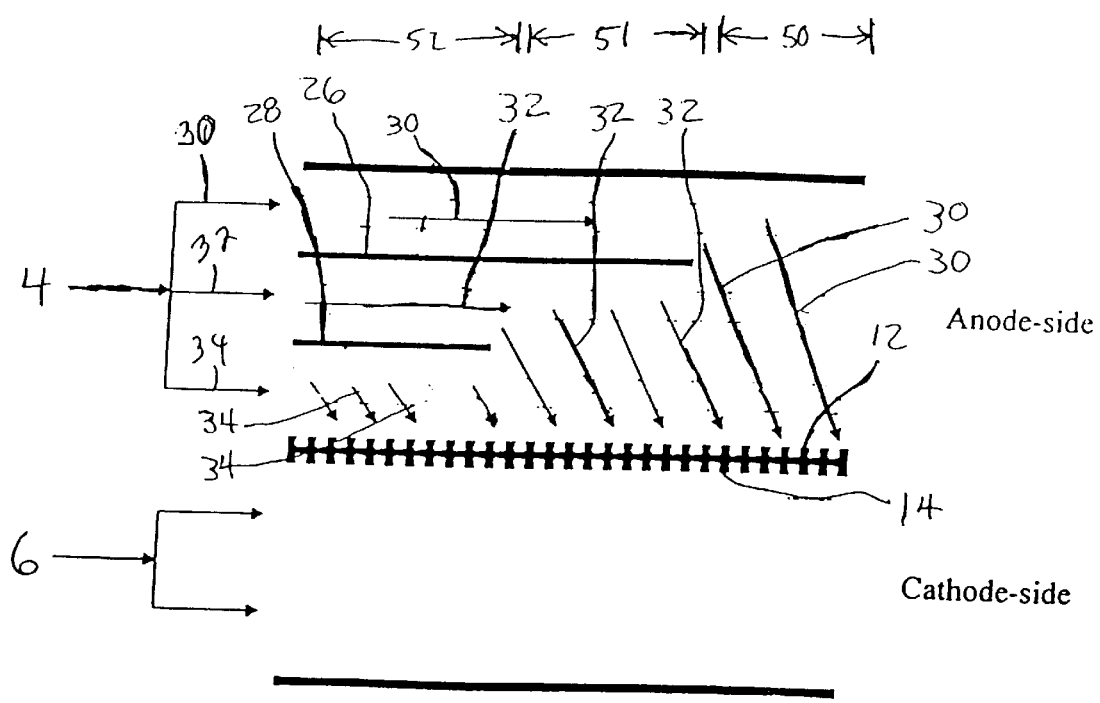
FIG. 3 is a cross-sectional side view of a fuel cell having a pair of staging plate therein to split the flow of fuel over the anode as per another embodiment of the invention.
Figure 4:
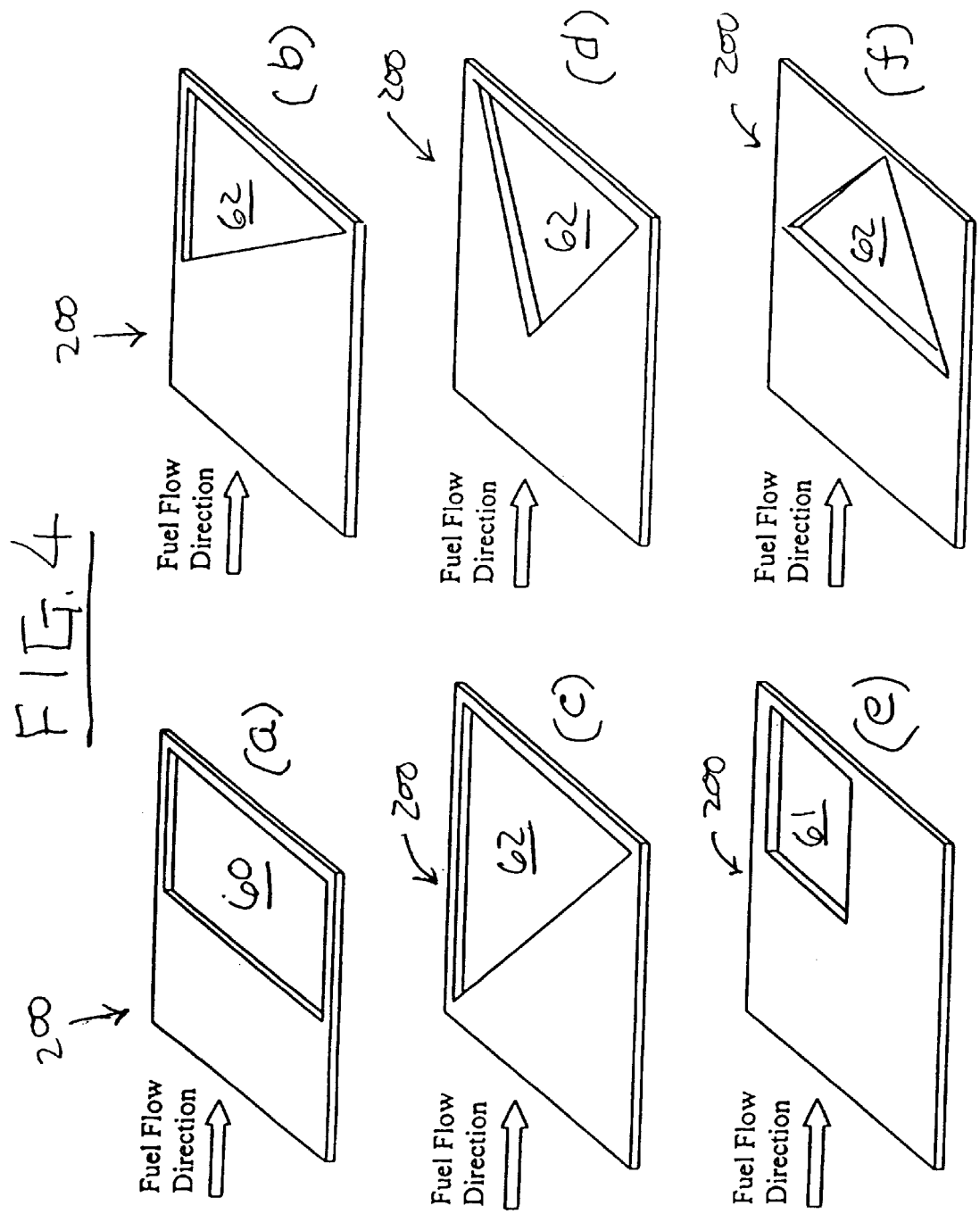
FIGS. 4a–4f are perspective views of various types of staging plates for planar fuel cells with an essentially rectangular shape, wherein the appertures have rectangular and triangular openings therein which may be used in the FIG. 2 or 3 embodiments.

Referring now to FIG. 2, where like numerals indicate similar elements throughout the drawings, a staged fuel inlet fuel cell assembly (18) is shown to have an internal staging plate (20) located on the anode (12) side of the cell (18). Staging plate (20) may be of any appropriate size or spacing from anode (12), as its primary purpose is to split the flow of the fuel (4) into two discrete branches (22, 24) with one branch (22) flowing on top of the plate (20) to react with the downstream side of the anode (50) (i.e., the outlet side) while the bottom section (24) flows along the upstream side of the anode (52) (i.e., the inlet side) to react therewith. This split flow minimizes the fuel utilization resistance by reducing the variation in fuel concentration over the enitre surface anode (12).

With the internal staging provided by the plate (20), the fuel (4) is well-distributed on different sections of the anode (50, 52). Accordingly, the fuel utilization resistance is lowered and the fuel composition gradients are minimized. Not surprisingly, this technique is even more beneficial for large surface area fuel cells, where the fuel utilization resistance is high.

Referring now to FIG. 3, a second embodiment of the invention is shown. Here, two staging plates (26, 28) are used to further split the fuel flow into three discrete sections (30, 32, 34). As above, the first plate (26) and second plate (28) are placed strategically to minimize the fuel gradients across the entire surface of anode (12) and to further optimize fuel cell performance. Plate (26) provides a top flow volume (30) which passes fuel (4) to the downstream portion (50) of the anode (12) while middle flow (32) and plate (28) deliver fuel (4) to the middle portion (51) and bottom flow (34) is directed onto upstream portion (52) of the anode (12).

Turning now to FIGS. 4a–4f, it will be seen that the configuration of any/all of the plates of the present invention, now generally designated as (200), may be solid plates or the longitudinal surfaces of these may have various outlet configurations formed thereon. These configurations may be of any type which help to optimize cell performance, and they are most preferably in the shape of rectangles (60) (FIG. 4a), squares (61) (FIG. 4e) and/or triangles (62) (FIGS. 4b, 4c, 4d, and 4f) to provide raw fuel to anode areas (not shown) deemed needing staging.

Figure 5:
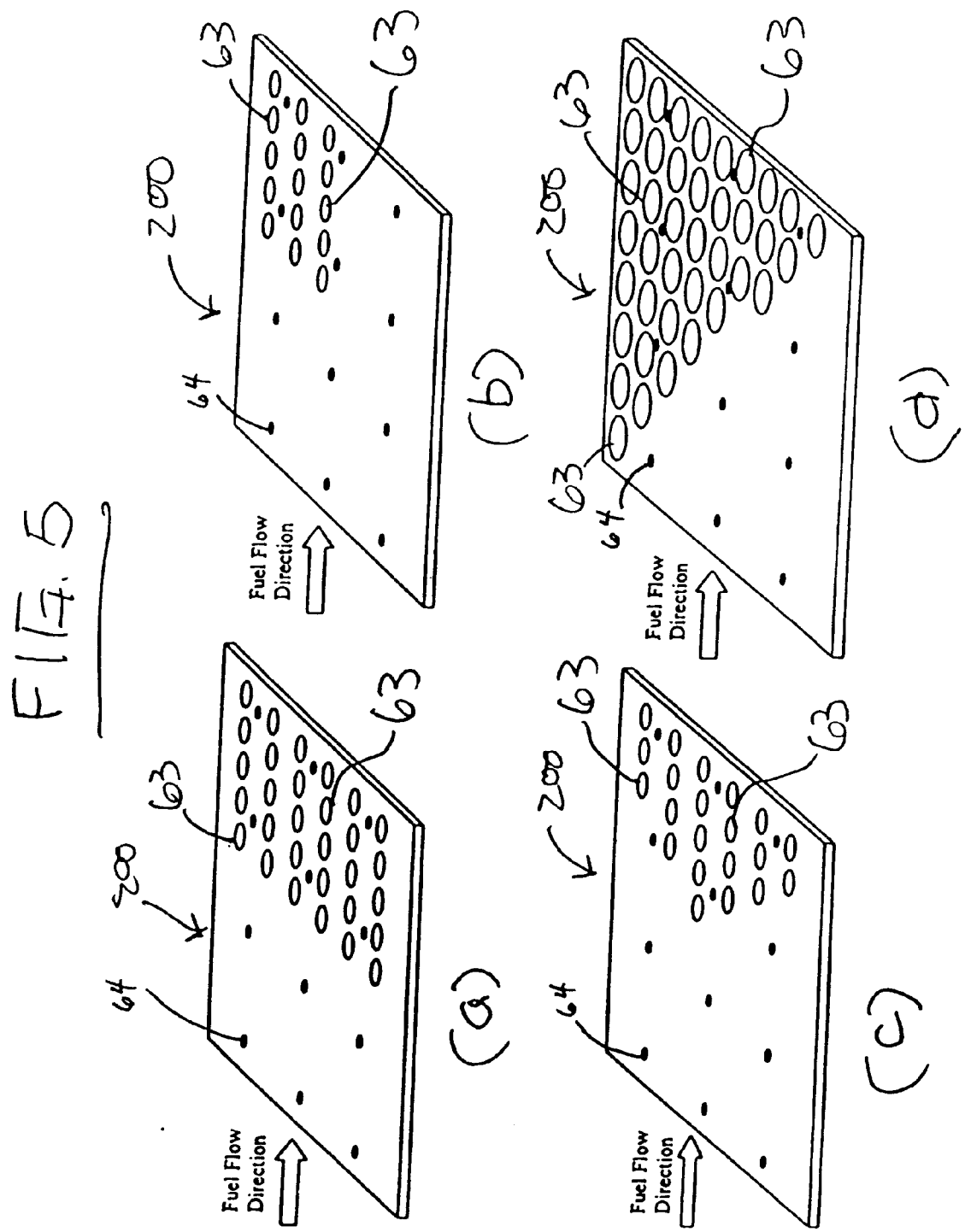
FIGS. 5a–5d are perspective view of various types of staging plates for planar fuel cells with an essentially rectangular shape, wherein the appertures have round and oval opening patterns thereon which may be used in the FIG. 2 or 3 embodiments.

Similarly, FIGS. 5a–5d show a variety of outlet configurations comprised of patterns of round, oval, or otherwise curved apertures (63) designed to assist in various types of staging requirements. The particular type of opening and configuration will depend on particular circumstances. However, in the preferred embodiment, the apertures line have a linear arrangement and cover a rectangular area on the plate (FIG. 5a), a square area on the plate (FIG. 5b), or an essentially triangular area on the plate (FIGS. 5c–5d).

The plates of the present invention (200) must also provide for electronic conduction. This can be achieved in a number of ways. The plates can be fabricated from an electronically conductive material, such as high temperature metals or $LaCrO_3$ type ceramics. Alternatively, the plates are made of an insulating ceramic and electronic conduction is provided by vias (64) filled with a conductive material, as is shown in FIGS. 5a–5d and 4a–4f.

Figure 6A:
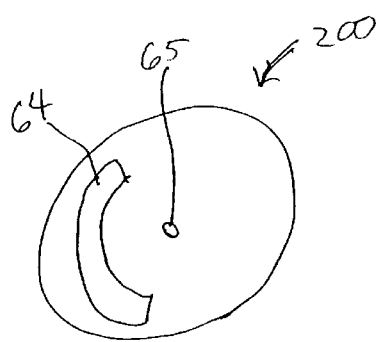
FIGS. 6a and 6b are top views of various types of staging plates for planar fuel cells with an disk shape, wherein the appertures have slots thereon which may be used in the FIG. 2 or 3 embodiments.
Figure 6B:
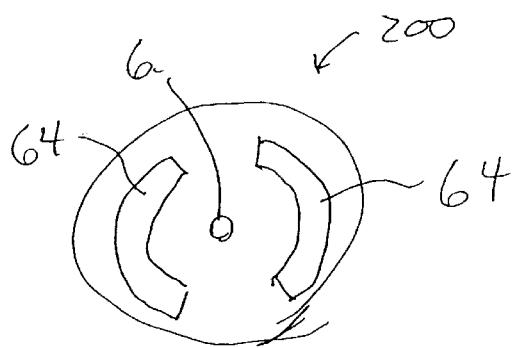
Figure 7A:
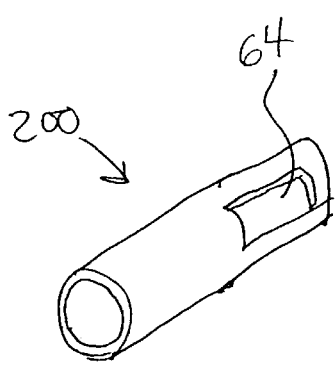
FIGS. 7a and 7b are perspective views of various types of staging plates for tubular fuel cells, wherein the appertures have slots and round and oval opening patterns thereon which may be used in the FIG. 2 or 3 embodiments.
Figure 7B:
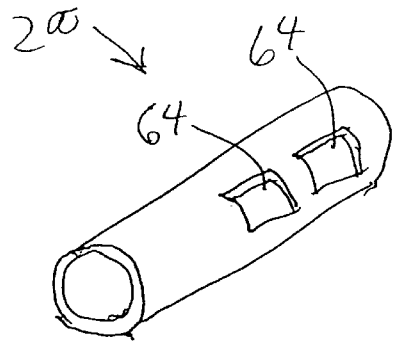

Finally, the present invention is equally applicable to disk-shaped planar, as well as tubular, fuel cells. FIGS. 6a–6b show some of the variations that need to be made to the plate (200) to accommodate such disk-shaped planar cells, including at least one slot (64) and a central aperture (65) for fuel inlet, while FIGS. 7a–7b cover the variations attendant to tubular cells, including at least one slot (64). Notably, for tubular arrangements, the plate (200) must also be modified to have the shape of a tube, such that it will form an annular flow channel around the anode. As above, these configurations provide the general framework of the invention, and the exact size and location of these slots and/or apertures may be varied until the desired performance characteristics are achieved.

From the foregoing it will be seen that the present fuel cell construction offers certain definite advantages over prior art construction as listed below:

1. The proposed internal fuel staging is a novel and economical way to improve anode side spatial fuel distribution.
2. This technique will improve and minimize the temperature distribution across the cells.
3. This technique will minimize the fuel utilization resistance by minimizing fuel composition gradients.
4. The staging technique is very simple to implement in multi-layered fuel cell stacks.
5. The staging plate geometry and other parameters could be optimized to give better fuel cell performance.
6. The staging plates will not complicate the existing flow passages and manifolds, and will not affect the pressure drops.
7. The plates could be made of the same stack material to match thermal expansion, electronic conductivity and other properties with those of the stack components.
8. The thin plate design will not cause any dramatic increase in stack height or weight.
9. The technique is equally suited to the cathode-side air staging for incremental benefits.
10. The proposed staging technique could be extended to disk-shaped planar fuel cell designs, as well as tubular designs.
11. The proposed technique can be applied to other solid electrolyte-type fuel cells (e.g. PEMs).

Certain additions and modifications will occur to those skilled in this art area upon considering this disclosure. It will be understood that all such have been deleted herein for the sake of conciseness and readability but are intended to fall within the scope of the following claims.

We claim:

1. A fuel cell having an anode side and a cathode side with fuel flowing through the anode side and air flowing through the cathode side comprising:
   an anode;
   an anode chamber defining a path for fuel flow across said anode; and
   a staging plate located in said anode chamber to divide the flow of fuel there through to different staging areas of said anode, wherein said anode chamber forms an annular space surrounding said anode.

2. A fuel cell as set forth in claim 1, wherein said staging plate is a plate extending parallel to said anode for a distance to divide the fuel flow between a first part of said anode and a second part of said anode.

3. A fuel cell as set forth in claim 2, wherein said staging plate is formed to have at least one slot over a section thereof.

4. A fuel cell as set forth in claim 1, wherein the staging plate includes means for electronic conduction.

5. A fuel cell as set forth in claim 4, wherein the means for electronic conduction comprises at least one filled via extending through the staging plate.

6. A fuel cell as set forth in claim 1, including a second staging plate and wherein said first and second staging plate divide the flow of fuel across three different sections of said anode.

7. A fuel cell as set forth in claim 6, wherein at least one of said first and second staging plates are formed to have at least one slot over a section thereof.

8. A fuel cell having a anode side and a cathode side with fuel flowing through the anode side and air flowing through the cathode side comprising:
   an anode; and
   an anode chamber defining a path for fuel flow across said anode; and
   a staging plate located in said anode chamber to divide the flow of fuel there through to different staging areas of said anode, wherein said staging plate has a planar disk shape.

9. A fuel cell as set forth in claim 8, wherein said staging plate is a plate extending parallel to said anode for a distance to divide the fuel flow between a first part of said anode and a second part of said anode.

10. A fuel cell as set forth in claim 9, wherein said staging plate is formed to have a central aperture and at least one slot over a section thereof.

11. A fuel cell as set forth in claim 8, further comprising a second staging plate located in said anode chamber to divide the flow of fuel there through to different staging areas of said anode, wherein said first and second staging plate divide the flow of fuel across three different sections of said anode.

12. A fuel cell as set forth in claim 11, wherein at least one of said first and second staging plates are formed to have a central aperture and at least one slot over a section thereof.

13. A fuel cell as set forth in claim 11, wherein the first and second staging plates include means for electronic conduction.

14. A fuel cell as set forth in claim 13, wherein the means for electronic conduction comprises at least one filled via extending through the first and second staging plates.

15. A fuel cell as set forth in claim 8, wherein the staging plate includes means for electronic conduction.

16. A fuel cell as set forth in claim 15, wherein the means for electronic conduction comprises at least one filled via extending through the staging plate.

17. A fuel cell having an anode side and a cathode side with fuel flowing through the anode side and air flowing through the cathode side comprising:
   an anode;
   an anode chamber defining a path for fuel flow across said anode; and
   a staging plate located in said anode chamber to divide the flow of fuel there through to different staging areas of said anode, wherein said staging plate extending parallel to said anode for a distance to divide the fuel flow between a first part of said anode and a second part of said anode and wherein said staging plate includes at least one filled via extending through the staging plate.

18. A fuel cell having an anode side and a cathode side with fuel flowing through the anode side and air flowing through the cathode side comprising:
   an anode;
   an anode chamber defining a path for fuel flow across said anode;
   a first staging plate located in said anode chamber to divide the flow of fuel there through to different staging areas of said anode; and
   a second staging plate located in said anode chamber to divide the flow of fuel there through to different staging areas of said anode, wherein said first and second staging plates divide the flow of fuel across three different sections of said anode and wherein the first and second staging plates include means for electronic conduction.

19. A fuel cell as set forth in claim 18, wherein means for electronic conduction comprises at least one filled via extending through the first and second staging plates.

* * * * *